United States Patent
Ge et al.

(10) Patent No.: US 10,343,930 B2
(45) Date of Patent: Jul. 9, 2019

(54) DIELECTRIC COMPOSITION AND ELECTRIC COMPONENTS

(71) Applicants: TDK CORPORATION, Tokyo (JP); TDK XIAMEN CO., LTD., Xiamen, Fujian (CN)

(72) Inventors: Guibin Ge, Xiamen (CN); RuiLun Zhang, Xiamen (CN); Fan Zhang, Xiamen (CN); Jintao Huang, Xiamen (CN); Kazuya Muto, Tokyo (JP); Daisuke Ohtsu, Tokyo (JP); Kakeru Watanabe, Tokyo (JP)

(73) Assignees: TDK CORPORATION, Tokyo (JP); TDK XIAMEN CO., LTD., Xiamen (CN)

( * ) Notice: Subject to any disclaimer, the term of this patent is extended or adjusted under 35 U.S.C. 154(b) by 0 days.

(21) Appl. No.: 15/856,662

(22) Filed: Dec. 28, 2017

(65) Prior Publication Data
US 2018/0179078 A1    Jun. 28, 2018

(30) Foreign Application Priority Data
Dec. 28, 2016    (CN) .......................... 2016 1 1235524

(51) Int. Cl.
*H01G 4/12*    (2006.01)
*C04B 35/468*    (2006.01)
(Continued)

(52) U.S. Cl.
CPC ......... *C01G 23/006* (2013.01); *C01G 29/006* (2013.01); *C04B 35/465* (2013.01);
(Continued)

(58) Field of Classification Search
CPC .... C04B 35/4682; C04B 35/47; C04B 35/475
See application file for complete search history.

(56) References Cited

U.S. PATENT DOCUMENTS 4,058,404 A * 11/1977 Fujiwara ............... C04B 35/465
                                                                   501/137
6,344,427 B1 * 2/2002 Komatsu ............. C04B 35/4682
                                                                   361/321.2
(Continued)

FOREIGN PATENT DOCUMENTS

JP      2003-163132 A      6/2003
JP      2007153659 A *     6/2007
JP      2008174413 A *     7/2008

*Primary Examiner* — Karl E Group
(74) *Attorney, Agent, or Firm* — Oliff PLC

(57) ABSTRACT

The present invention relates to the dielectric composition including barium titanate, strontium titanate, titanium oxide and bismuth oxide. In case when the content of barium titanate, converted to $BaTiO_3$, is a mol %, the content of strontium titanate, converted to $SrTiO_3$, is b mol %, the content of titanium oxide and bismuth oxide, converted to $Bi_2Ti_3O_9$, is c mol %, and a+b+c=100, a, b and c are values within a scope surrounded by the following four points, i.e. point A, point B, point C and point D in a three-dimensional phase diagram. Point A: (a, b, c)=(52.1, 40.0, 7.9); point B: (a, b, c)=(86.5, 5.6, 7.9); point C: (a, b, c)=(91.0, 5.6, 3.4); point D: (a, b, c)=(56.6, 40.0, 3.4).

15 Claims, 2 Drawing Sheets

(51) Int. Cl.
  *C04B 35/47*    (2006.01)
  *C04B 35/475*   (2006.01)
  *C01G 23/00*    (2006.01)
  *H01B 3/12*     (2006.01)
  *C01G 29/00*    (2006.01)
  *C04B 35/465*   (2006.01)
  *C04B 35/626*   (2006.01)
  *H01G 4/10*     (2006.01)
  *H01G 4/33*     (2006.01)

(52) U.S. Cl.
  CPC .......... *C04B 35/4682* (2013.01); *C04B 35/47* (2013.01); *C04B 35/475* (2013.01); *C04B 35/62685* (2013.01); *H01B 3/12* (2013.01); *H01G 4/10* (2013.01); *H01G 4/1227* (2013.01); *C01P 2002/34* (2013.01); *C04B 2235/3213* (2013.01); *C04B 2235/3215* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3234* (2013.01); *C04B 2235/3236* (2013.01); *C04B 2235/3244* (2013.01); *C04B 2235/3251* (2013.01); *C04B 2235/3262* (2013.01); *C04B 2235/3277* (2013.01); *C04B 2235/3284* (2013.01); *C04B 2235/3293* (2013.01); *C04B 2235/3298* (2013.01); *C04B 2235/442* (2013.01); *C04B 2235/768* (2013.01); *H01G 4/33* (2013.01)

(56) References Cited

U.S. PATENT DOCUMENTS 6,917,513 B1* 7/2005 Kim .................... H01G 4/1227
                                              361/321.2
2003/0203805 A1* 10/2003 Maher ................. C04B 35/468
                                              501/137

* cited by examiner

DIELECTRIC COMPOSITION AND ELECTRIC COMPONENTS

BACKGROUND OF THE INVENTION

1. Field of the Invention

The present invention relates to a dielectric composition and electric components.

2. Description of the Related Art

In recent years, along with the rapid performance-enhancing of electric machines, electric circuits also develop rapidly toward miniaturization and complication. Therefore, higher demand is made on the miniaturization and performance-enhancing of electric components. That is, dielectric compositions and electric components which have high relative dielectric constant, low loss, high AC breakdown voltage for utilization under high voltage, and excellent temperature characteristic are required.

In view of the above requirement, a dielectric composition of $PbTiO_3$—$SrTiO_3$—$Bi_2Ti_3O_9$ system is set forth in the patent document 1. However, the dielectric composition is not environment-friendly due to the inclusion of lead.

PRIOR TECHNICAL DOCUMENT

Patent Document

[Patent Document 1] Japanese laid-open patent application No. 2003-163132

SUMMARY OF THE INVENTION

Problems to be Solved by the Invention

The present invention aims to provide a dielectric composition which has excellent relative dielectric constant and AC breakdown voltage and low dielectric loss at normal temperature without substantial utilization of lead, and electric components including the dielectric composition.

Means for Solving the Problem

In order to achieve the above purpose, the dielectric composition of the present invention is a dielectric composition including barium titanate, strontium titanate, titanium oxide and bismuth oxide, in which when a content of barium titanate converted to $BaTiO_3$ is a mol %, the content of strontium titanate converted to $SrTiO_3$ is b mol %, the content of titanium oxide and bismuth oxide converted to $Bi_2Ti_3O_9$ is c mol %, and a+b+c=100, a, b and c are values within a scope surrounded by four points, i.e. point A, point B, point C and point D in a three-dimensional phase diagram.

point A: (a, b, c)=(52.1, 40.0, 7.9)
point B: (a, b, c)=(86.5, 5.6, 7.9)
point C: (a, b, c)=(91.0, 5.6, 3.4)
point D: (a, b, c)=(56.6, 40.0, 3.4)

Moreover, the dielectric composition of the present invention is more preferably a dielectric composition including barium titanate, strontium titanate, titanium oxide and bismuth oxide, in which when the content of barium titanate converted to $BaTiO_3$ is a mol %, the content of strontium titanate converted to $SrTiO_3$ is b mol %, the content of titanium oxide and bismuth oxide converted to $Bi_2Ti_3O_9$ is c mol %, and a+b+c=100, a, b and c are values within the scope surrounded by the following four points, i.e. point A', point B, point C and point D' in the three-dimensional phase diagram.

point A': (a, b, c)=(64.1, 28.0, 7.9)
point B: (a, b, c)=(86.5, 5.6, 7.9)
point C: (a, b, c)=(91.0, 5.6, 3.4)
point D': (a, b, c)=(70.8, 25.8, 3.4)

By being set to the above specific composition and content, the dielectric composition of the present invention can have excellent relative dielectric constant and AC breakdown voltage and reduce the dielectric loss at normal temperature, though lead is not substantially utilized.

In the dielectric composition of the present invention, when the total content of the titanium oxide and the bismuth oxide, converted to $Bi_2Ti_3O_9$, is 100 wt %, the titanium oxide and the bismuth oxide existing in the form of bismuth titanate are preferably 80 wt % or more.

The dielectric composition of the present invention preferably includes at least one of a first subcomposition to a fourth subcomposition, when the first subcomposition includes at least one of compounds containing manganese and compounds containing cobalt, the second subcomposition includes compounds containing niobium, the third subcomposition includes at least one of compounds containing zirconium, compounds containing tin and compounds containing zinc, and the fourth subcomposition includes at least one of compounds containing yttrium, compounds containing lanthanum, compounds containing cerium, compounds containing neodymium, compounds containing samarium and compounds containing dysprosium.

Furthermore, when the total content of barium titanate, strontium titanate, titanium oxide and bismuth oxide is 100 wt %, the following situation is preferable:

the content of the first subcomposition, i.e. the compounds containing manganese, converted to $MnCO_3$, is 0.8 wt % or less (including zero), the content of the compounds containing cobalt, converted to $Co_3O_4$, is 1.7 wt % or less (including zero), the content of the second subcomposition, i.e. the compounds containing niobium, converted to $Nb_2O_5$, is 1.3 wt % or less (including zero), when the content of each composition included in the third subcomposition is converted to $ZrO_2$, $SnO_2$, $ZnO$ respectively, the total content of the third subcomposition is 5.5 wt % or less (including zero), and when the content of each composition included in the fourth subcomposition is converted to $Y_2O_3$, $La_2O_3$, $CeO_2$, $Nd_2O_3$, $Sm_2O_3$, $Dy_2O_3$ respectively, the total content of the fourth subcomposition is 1.0 wt % or less (including zero).

The dielectric composition of the present invention preferably includes all the compositions from the first subcomposition to the fourth subcomposition.

In the dielectric composition of the present invention, the content of the third subcomposition is preferably 24-85% of the total content of compositions from the first subcomposition to the fourth subcomposition.

In the dielectric composition of the present invention, the total content of the third subcomposition and the fourth subcomposition is preferably 40-90% of the total content of compositions from the first subcomposition to the fourth subcomposition.

The electric components of the present invention include the above dielectric composition.

DESCRIPTION OF THE PREFERRED EMBODIMENTS

Detailed embodiments of the present invention are described below based on the accompanying drawings.

Figure 1:
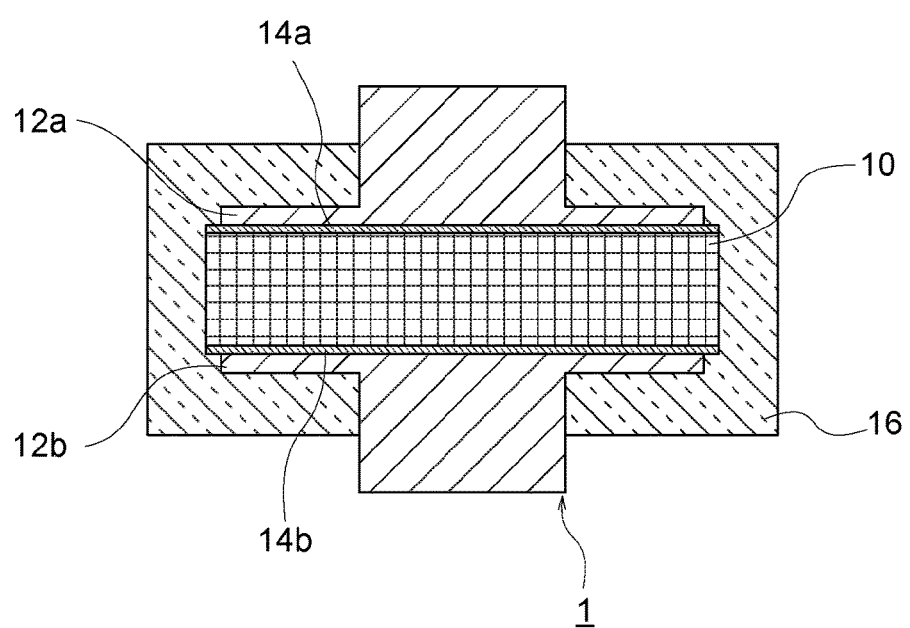
FIG. 1 is a cross sectional view of a single layer capacitor according to an embodiment of the present invention.

The type of electric components including the dielectric composition of the present embodiment is not particularly limited, and a single layer capacitor 1 shown in FIG. 1 is taken as an example.

The single layer capacitor 1 shown in FIG. 1 has a dielectric composition 10 of the present embodiment. Terminals 12a, 12b are fixed on both surfaces of the dielectric composition 10 via electrodes 14a, 14b respectively, and the whole surface surrounding the terminals is covered by synthetic resin 16.

The dielectric composition of the present embodiment includes barium titanate, strontium titanate, titanium oxide and bismuth oxide of a content within a specific scope. The barium titanate, strontium titanate, titanium oxide and bismuth oxide are sometimes called as the main composition hereinafter.

Specifically speaking, when the content of barium titanate converted to $BaTiO_3$ is a mol %, the content of strontium titanate converted to $SrTiO_3$ is b mol %, the content of titanium oxide and bismuth oxide converted to $Bi_2Ti_3O_9$ is c mol %, and a+b+c=100, each composition is contained in a way that a, b and c are values within the scope surrounded by four points, i.e. point A, point B, point C and point D in a three-dimensional phase diagram.

point A: (a, b, c)=(52.1, 40.0, 7.9)
point B: (a, b, c)=(86.5, 5.6, 7.9)
point C: (a, b, c)=(91.0, 5.6, 3.4)
point D: (a, b, c)=(56.6, 40.0, 3.4)

Moreover, each composition is more preferably contained in a way that a, b and c are values within the scope surrounded by four points, i.e. point A', point B, point C and point D' in the three-dimensional phase diagram.

point A': (a, b, c)=(64.1, 28.0, 7.9)
point B: (a, b, c)=(86.5, 5.6, 7.9)
point C: (a, b, c)=(91.0, 5.6, 3.4)
point D': (a, b, c)=(70.8, 25.8, 3.4)

Figure 2:
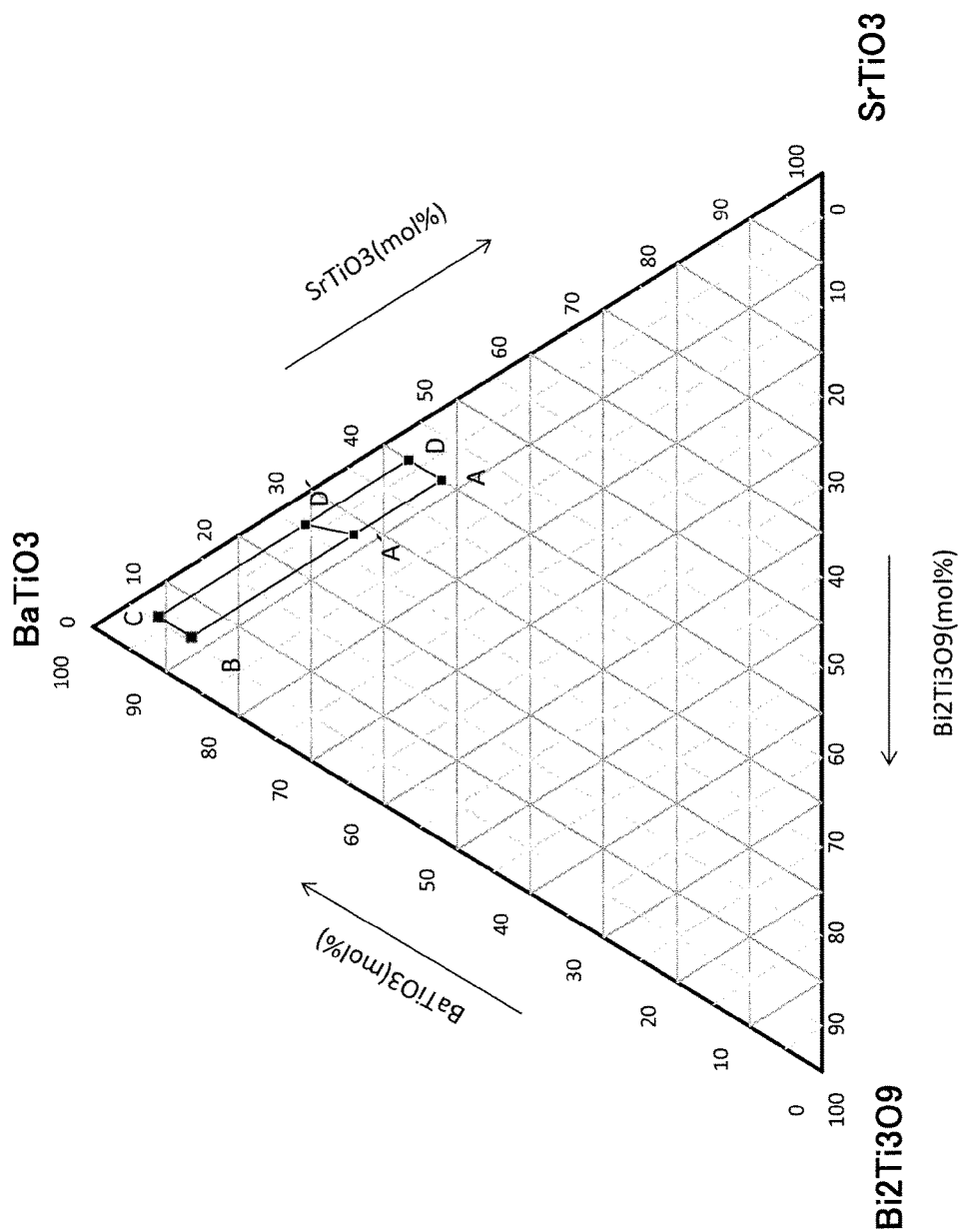
FIG. 2 is a three-dimensional phase diagram of the main composition of the present embodiment.

The three-dimensional phase diagram indicating the position of each of the above points is shown in FIG. 2.

By making the content of each main composition fall into the scope limited by the four points, i.e. point A, point B, point C and point D, the dielectric composition of the present embodiment can have excellent relative dielectric constant and AC breakdown voltage and reduce the dielectric loss at normal temperature though lead is not substantially utilized. When the content of each main composition is within the scope surrounded by the four points, i.e. point A', point B, point C and point D', the overall balance of the relative dielectric constant, the temperature characteristic and the dielectric loss tend to be more excellent. When the content of each main composition is within the scope surrounded by the four points, i.e. point A', point B, point C and point D', the dielectric loss at high temperature, in particular, tends to decrease. In the present application, "normal temperature" means a temperature around 25° C., more specifically, about 20-30° C. "High temperature" means a temperature around 125° C., more specifically, about 100-150° C.

In addition, the fact that lead is not substantially utilized in the dielectric composition of the present embodiment means, in particular, when the whole dielectric composition is 100 wt %, the content of lead is 0.001 wt % or less. By not substantially utilizing lead in the dielectric composition of the present embodiment, environmental load can be reduced.

The titanium oxide and bismuth oxide may exist independently in the dielectric composition, but the existence in the form of bismuth titanate ($Bi_2Ti_3O_9$) is preferred. By making the titanium oxide and bismuth oxide exist in the form of bismuth titanate, AC breakdown voltage and temperature characteristic can be further improved, and dielectric loss can be further decreased.

Whether the titanium oxide and bismuth oxide exist independently or exist in the form of bismuth titanate in the dielectric composition can be determined by observing the internal structure of the dielectric composition by XRD, EPMA, TEM-EDS and etc. Specifically speaking, each phase can be identified by the diffraction peak of XRD, or by observing and overlapping the mapping of Ba, Sr, Bi, Ti. Besides, when the content of titanium oxide and bismuth oxide in the dielectric composition, converted to $Bi_2Ti_3O_9$, is 100 wt %, the ratio of the titanium oxide and bismuth oxide existing in the form of bismuth titanate is preferably 80 wt % or more.

The dielectric composition of the present embodiment preferably includes at least one of compounds containing manganese and compounds containing cobalt as the first subcomposition. By including the first subcomposition, the temperature characteristic can be excellent.

When the main composition as a whole is 100 wt %, the content of the compounds containing manganese, converted to $MnCO_3$, is preferably 0.8 wt % or less, and more preferably 0.5-0.8 wt %. By including compounds containing manganese within the above scope, the relative dielectric constant and AC breakdown voltage can be excellent, the dielectric loss can be reduced and the temperature characteristic can be improved.

When the main composition as a whole is 100 wt %, the content of the compounds containing cobalt, converted to $Co_3O_4$, is preferably 1.7 wt % or less, and more preferably 0.5-1.7 wt %. By including compounds containing cobalt within the above scope, the relative dielectric constant and AC breakdown electric field can be excellent, the dielectric loss can be reduced and the temperature characteristic can be improved.

The dielectric composition of the present embodiment preferably includes compounds containing niobium as a second subcomposition. By including the second subcomposition, the temperature characteristic can be excellent, and the dielectric loss can be reduced.

When the main composition as a whole is 100 wt %, the content of the compounds containing niobium, converted to $Nb_2O_5$, is preferably 1.3 wt % or less, and more preferably 0.5-1.3 wt %. By including compounds containing niobium within the above scope, the relative dielectric constant and AC breakdown voltage can be excellent, the dielectric loss can be reduced and the temperature characteristic can be improved.

The dielectric composition of the present embodiment preferably includes at least one of compounds containing zirconium, compounds containing tin and compounds containing zinc as a third subcomposition. By including the third subcomposition, the temperature characteristic can be excellent, and the dielectric loss can be reduced.

When the content of each composition is converted to $ZrO_2$, $SnO_2$, $ZnO$ respectively, the total content of the third subcomposition is preferably 5.5 wt % or less, and more preferably 0.5-5.5 wt %. By including the third subcomposition within the above scope, the relative dielectric constant and AC breakdown voltage can be excellent, the dielectric loss can be reduced and the temperature characteristic can be improved.

The dielectric composition of the present embodiment preferably includes at least one of compounds containing yttrium, compounds containing lanthanum, compounds containing cerium, compounds containing neodymium, compounds containing samarium and compounds containing dysprosium as a fourth subcomposition. By including the fourth subcomposition, the temperature characteristic can be excellent, and the dielectric loss can be reduced.

When the content of each composition is converted to $Y_2O_3$, $La_2O_3$, $CeO_2$, $Nd_2O_3$, $Sm_2O_3$, $Dy_2O_3$ respectively, the total content of the fourth subcomposition is preferably 1.0 wt % or less, and more preferably 0.10-1.0 mass %. By including the fourth subcomposition within the above scope, the relative dielectric constant and AC breakdown voltage can be excellent, the dielectric loss can be reduced and the temperature characteristic can be improved.

The dielectric composition of the present embodiment preferably includes at least one of the first subcomposition to the fourth subcomposition, and more preferably includes all compositions from the first subcomposition to the fourth subcomposition. By including all compositions from the first subcomposition to the fourth subcomposition, the dielectric loss can be reduced, and the temperature characteristic can be excellent. When all compositions from the first subcomposition to the fourth subcomposition are contained, the dielectric loss at high temperature in particular can be greatly improved.

In addition, when all compositions from the first subcomposition to the fourth subcomposition are contained, as for the content of the first subcomposition, the content of compounds containing manganese converted to $MnCO_3$ is preferably 0.8 wt % or less, and the content of compounds containing cobalt converted to $Co_3O_4$ is 1.7 wt % or less. The content of the second subcomposition is preferably 1.3 wt % or less. The total content of the third subcomposition is preferably 5.5 wt % or less. The total content of the fourth subcomposition is preferably 1.0 wt % or less.

Furthermore, when all compositions from the first subcomposition to the fourth subcomposition are contained, the content of the third subcomposition is preferably 24-85% of the total content of compositions from the first subcomposition to the fourth subcomposition. In this case, the dielectric loss at normal temperature further decreases, and the temperature characteristic further improves.

Furthermore, the situation is preferred when the content of the third subcomposition is 24-85% of the total content of compositions from the first subcomposition to the fourth subcomposition, and the total content of the third subcomposition and the fourth subcomposition is 40-90% of the total content of compositions from the first subcomposition to the fourth subcomposition. In this case, the dielectric loss at normal temperature further decreases, and the temperature characteristic further improves.

The manufacturing method of the dielectric composition and the electric components of the present embodiment is described below, but the manufacturing method of the dielectric composition and the electric components is not limit to the following method.

First, raw powder of the dielectric composition of the present embodiment is prepared. The raw powder may be the powder of the compounds of each composition, or the powder of the compounds which become each composition after firing. Among all the compositions, as for the barium titanate ($BaTiO_3$) and strontium titanate ($SrTiO_3$), preparation of barium titanate powder and strontium titanate powder is preferable when preparing the raw material. In addition, as for the titanium oxide and bismuth oxide, independent preparation of the powder of the compounds which become titanium oxide after firing and the powder of the compounds which become bismuth oxide after firing is acceptable, but preparation of bismuth titanate ($Bi_2Ti_3O_9$) powder is preferred. When the whole raw powder which becomes titanium oxide and bismuth oxide at last, converted to $Bi_2Ti_3O_9$, is 100 wt %, by including 80 wt % or more of bismuth titanate powder, the ratio of bismuth titanate in the dielectric composition obtained at last can also be 80 wt % or more.

As for the first subcomposition to the fourth subcomposition, besides the oxides of each element, compounds which become the oxides of each element after firing, for example, carbonate, nitrate, sulfate, and etc., can also be prepared.

Next, the raw powder of each composition are mixed to obtain the mixed powder. There is no special limit on the mixing method, and general methods, such as dry mixing, wet mixing, etc., can be adopted.

Next, the mixed powder is granulated and perform sizing after the granulation when necessary to obtain granular powder. There is no special limit on the granulation method. For example, the PVA (polyvinyl alcohol) solution is added to the mixed powder to granulate. In addition, there is also no limit on the sizing method. For example, sieving can be performed to remove bulky granulated powder.

Next, the granular powder was compacted to obtain a green compact including the dielectric composition. There is no special limit on the compacting method, and general methods can be adopted. For example, press compaction can be adopted. There is no special limit on the pressure for pressing. For example, the pressure may be 200-600 MPa.

Next, fire the obtained green compact to obtain a sintered body including the dielectric composition. There is no special limit on the firing condition. The firing temperature may be 1200-1350° C. There is also no special limit on the firing atmosphere. For example, the atmosphere may be the air, a nitrogen atmosphere, or a reducing atmosphere of nitrogen and hydrogen, or may be other atmospheres.

Furthermore, the obtained sintered body is joined to a pair of electrodes. The pair of electrodes are, for example, joined to two opposing surfaces of the obtained sintered body.

There is also no special limit on the method to join the electrodes to the obtained sintered body. For example, the electrodes can be joined to the obtained sintered body by coating electrode paste to the obtained sintered body and sintering at 700-900° C.

Furthermore, terminals are connected via the electrodes. There is no special limit on the method to connect the terminals via the electrodes. Next, the whole surface surrounding the dielectric composition is covered by resin so that a part of the terminals is exposed. There is no special limit on the covering method and the type of resin used to cover.

The single layer capacitor shown in FIG. 1 is obtained in this way. By utilizing the dielectric composition of the present embodiment, the single layer capacitor can be used under very high voltage.

The method to manufacture the electric component of the present embodiment, i.e. the single layer capacitor shown in FIG. 1, is described above, but the capacitor of the present invention is not limited to the single layer capacitor, and may be capacitors other than the single layer capacitor, such as a laminated capacitor. There is no special limit on the manufacturing method of the laminated capacitor, and existing manufacturing method can be utilized. In addition, the capacitor of the present invention may be used as a capacitor for high frequency or a capacitor for high voltage, without special limit on the application.

EXAMPLES

The present invention is further described based on examples in detail below, but the present invention is not limited thereto.

Example 1

Barium titanate powder, strontium titanate powder, bismuth titanate powder, and powders that become the first subcomposition to the fourth subcomposition after firing were prepared as the raw powder, and were weighed to finally obtain the sintered body with the composition in the examples and comparative examples described in Table 1-Table 3. In addition, in Table 1, BT stands for barium titanate ($BaTiO_3$), ST stands for strontium titanate ($SrTiO_3$), and BiTi stands for bismuth titanate ($Bi_2Ti_3O_9$). Besides, in sample No. 1a, titanium oxide powder and bismuth oxide powder, instead of bismuth titanate powder, were utilized.

In Table 1, when the content of the main composition was within the scope surrounded by the four points, i.e. point A, point B, point C, point D, o was recorded in the ABCD column, and when the content of main composition was beyond the scope limited by the four points, i.e. point A, point B, point C, point D, x was recorded in the ABCD column. Further, when the content of the main composition was within the scope surrounded by the four points, i.e. point A', point B, point C, point D', o was recorded in the A'BCD' column, and when the content of the main composition was beyond the scope limited by the four points, i.e. point A', point B, point C, point D', x was recorded in the A'BCD' column.

After each raw powder was mixed, a pot mill was utilized for fine grinding until the average particle diameter was about 0.5-3 μm. After dehydration drying of the fine ground powder, polyvinyl alcohol is added in the ratio of 10 parts by weight to 100 parts by weight of the raw powder, and granulation and sizing were performed to manufacture granular powder.

The granular powder was compacted under a pressure of 300 MPa to manufacture a disk-shaped green compact with a diameter of 16.5 mm and a thickness of 0.65 mm.

The green compact was fired in the air at 1200-1300° C. for 4 hours to obtain a disk-shaped ceramic green body. Fluorescent X-ray analysis was performed to confirm that the composition of the obtained ceramic green body was as shown in Table 1. Next, Ag electrode paste was applied to both surfaces of the ceramic green body and baked in the air at 800° C. for 15 minutes to obtain a capacitor sample with an electrode diameter of 12 mm. Enough ceramic capacitor samples were manufactured to perform all the evaluations below.

Then, AC breakdown electric field, relative dielectric constant, quality coefficient, temperature characteristic of electrostatic capacitance, reliability (rate of change in the electrostatic capacitance after exposed to a high temperature) were performed to obtained capacitor samples. The evaluation method was described below.

The measurement of AC breakdown electric field AC-Eb (kV/mm) was performed in the following way. An AC electric field was applied to both ends of the obtained capacitor sample. The strength of the AC electric field was raised at a speed of 200 V/s, and the change in leakage current by an AC voltage resistance tester was observed. The electric field at the time when leakage current becomes 50 mA is set as the AC breakdown electric field AC-Eb. The higher the AC-Eb was, the higher the AC breakdown voltage became, and the resistance to AC voltage was more excellent. In the present embodiment, AC-Eb≥5.0 kV/mm was determined good.

The relative dielectric constant(εs) was figured out from the electrostatic capacitance of the disk-shaped capacitor sample that is measured by an LCR meter under the condition of a temperature of 25° C., a frequency of 1 kHz and an input signal level (measuring voltage) of 1.0 Vrms. In the present embodiment, εs≥1250 was determined good, and εs≥1500 was determined better.

The dielectric loss (tan δ) of the capacitor sample at the reference temperature of 25° C. is measured by the LCR meter under the condition of the frequency of 1 kHz and the input signal level (measuring voltage) of 1.0 Vrms. In the present embodiment, the dielectric loss (tan δ) at the reference temperature of 25° C. was good when 0.70% or less. Further, the dielectric loss (tan δ) at the reference temperature of 125° C. was measured. Except for difference in the measuring temperature, the measuring conditions of the dielectric loss (tan δ) at the reference temperature of 125° C. were the same as the measuring conditions of the dielectric loss (tan δ) at the reference temperature of 25° C. In the present embodiment, the dielectric loss (tan δ) at the reference temperature of 125° C. was good when 0.80% or less. However, even if the dielectric loss (tan δ) at the reference temperature of 125° C. was not good, the purpose of the present invention can also be achieved.

The measuring method of the temperature characteristic TC (%) was as follows. First, the temperature was changed in the scope from −25° C. to +85° C. and the electrostatic capacitance at each temperature was measured. The electrostatic capacitance was measured by the LCR meter under the condition of the frequency of 1 MHz and the input signal level of 1 Vrms. Then, when the electrostatic capacitance at the reference temperature of +25° C. was $C_{25}$ and the electrostatic capacitance at the temperature of T (° C.) was $C_T$, the TC at each temperature was measured according to the following formula.

$$TC\ (\%)=\{(C_T-C_{25})/C_{25}\}\times10^2$$

In the present embodiment, the situations when −40≤TC≤+22 was always satisfied within the scope from −25° C. to +85° C. were defined good. In the present embodiment, for capacitor samples whose TC at −25° C. and +85° C. were both within the above scope, TC at other temperatures within the scope from −25° C. to +85° C. also fell into the above scope. Therefore, in Table 1-Table 3, TC at −25° C. and +85° C. were recorded. However, even if −40≤TC≤+22 was not always satisfied within the scope from −25° C. to +85° C., the purpose of the present invention could be achieved.

TABLE 1

| Sample No. | Main Composition (mol %) | | | | | | | Various Characteristics | | | | TC (%) | |
|---|---|---|---|---|---|---|---|---|---|---|---|---|---|
| | BT | ST | BiTi | Bi$_2$O$_3$ | TiO$_2$ | ABCD | A'BCD' | εs | 25° C. Tan δ | 125° C. Tan δ | AC-Eb (V) | −25° C. | 85° C. |
| 1a | 70.8 | 25.0 | 0.0 | 4.2 | 12.6 | ○ | ○ | 2903 | 0.56% | 1.85% | 5.4 | 21 | −41 |
| 1b | 70.8 | 25.0 | 4.2 | 0.0 | 0.0 | ○ | ○ | 2812 | 0.12% | 0.40% | 5.9 | 10 | −33 |
| 1 (point C) | 91.0 | 5.6 | 3.4 | 0.0 | 0.0 | ○ | ○ | 4019 | 0.69% | 0.30% | 5.3 | −15 | −33 |
| 2 | 81.0 | 13.0 | 6.0 | 0.0 | 0.0 | ○ | ○ | 2604 | 0.44% | 0.39% | 5.3 | 6 | −22 |
| 3 (point B) | 86.5 | 5.6 | 7.9 | 0.0 | 0.0 | ○ | ○ | 1839 | 0.34% | 0.30% | 5.4 | 13 | −15 |
| 4 (point D') | 70.8 | 25.8 | 3.4 | 0.0 | 0.0 | ○ | ○ | 3231 | 0.23% | 0.45% | 5.7 | 10 | −32 |
| 5 (point A') | 64.1 | 28.0 | 7.9 | 0.0 | 0.0 | ○ | ○ | 1812 | 0.05% | 0.40% | 5.9 | 8 | −20 |
| 6 | 70.6 | 26.0 | 3.4 | 0.0 | 0.0 | ○ | x | 3438 | 0.25% | 0.86% | 5.7 | 10 | −35 |
| 7 | 63.6 | 28.5 | 7.9 | 0.0 | 0.0 | ○ | x | 1756 | 0.07% | 0.90% | 5.6 | 8 | −23 |
| 8 (point D) | 56.6 | 40.0 | 3.4 | 0.0 | 0.0 | ○ | x | 2828 | 0.06% | 1.29% | 6.1 | 9 | −40 |
| 9 | 54.8 | 40.0 | 5.2 | 0.0 | 0.0 | ○ | x | 1890 | 0.29% | 7.87% | 6.0 | 10 | −33 |
| 10 (point A) | 52.1 | 40.0 | 7.9 | 0.0 | 0.0 | ○ | x | 1290 | 0.70% | 27.07% | 6.2 | 12 | −20 |
| 13* | #### | #### | 7.9 | 0.0 | 0.0 | x | x | 1220 | 0.75% | 33.06% | 5.8 | 12 | −18 |
| 15* | #### | 40.0 | 8.2 | 0.0 | 0.0 | x | x | 1165 | 0.73% | 29.36% | 6.2 | 10 | −16 |
| 17* | 64.0 | 28.0 | 8.0 | 0.0 | 0.0 | x | x | 1117 | 0.17% | 1.38% | 6.5 | 8 | −17 |
| 18* | #### | 4.6 | 3.0 | 0.0 | 0.0 | x | x | 4493 | 0.77% | 0.31% | 4.6 | −33 | −36 |
| 20* | 87.4 | 4.6 | 8.0 | 0.0 | 0.0 | x | x | 1249 | 0.35% | 0.27% | 5.4 | 12 | −22 |
| 22* | #### | 5.6 | 3.0 | 0.0 | 0.0 | x | x | 4444 | 0.76% | 0.45% | 4.7 | −24 | −33 |
| 23* | 85.9 | 5.6 | 8.5 | 0.0 | 0.0 | x | x | 1232 | 0.56% | 0.22% | 5.7 | −3 | −17 |
| 24 | 65.1 | 27.0 | 7.9 | 0.0 | 0.0 | ○ | ○ | 1715 | 0.04% | 0.28% | 6.2 | 8 | −21 |
| 25 | 80.0 | 15.0 | 5.0 | 0.0 | 0.0 | ○ | ○ | 3135 | 0.49% | 0.49% | 5.2 | 7 | −27 |
| 26 | 79.5 | 17.1 | 3.4 | 0.0 | 0.0 | ○ | ○ | 2705 | 0.39% | 0.42% | 5.9 | 9 | −33 |
| 27 | 78.8 | 16.2 | 5.0 | 0.0 | 0.0 | ○ | ○ | 2710 | 0.11% | 0.13% | 5.9 | 8 | −29 |
| 28 | 78.4 | 14.2 | 7.4 | 0.0 | 0.0 | ○ | ○ | 1688 | 0.23% | 0.28% | 5.2 | 6 | −9 |
| 29 | 75.6 | 17.0 | 7.4 | 0.0 | 0.0 | ○ | ○ | 1652 | 0.17% | 0.30% | 5.9 | 6 | −18 |
| 30 | 75.0 | 20.1 | 4.9 | 0.0 | 0.0 | ○ | ○ | 2490 | 0.08% | 0.15% | 6.1 | 8 | −28 |
| 31 | 73.1 | 19.0 | 7.9 | 0.0 | 0.0 | ○ | ○ | 1577 | 0.08% | 0.20% | 6.0 | 6 | −15 |
| 32 | 73.0 | 23.6 | 3.4 | 0.0 | 0.0 | ○ | ○ | 2951 | 0.08% | 0.20% | 5.9 | 10 | −31 |
| 33 | 72.6 | 21.7 | 5.7 | 0.0 | 0.0 | ○ | ○ | 2027 | 0.09% | 0.24% | 6.0 | 10 | −22 |
| 34 | 70.7 | 24.1 | 5.2 | 0.0 | 0.0 | ○ | ○ | 2173 | 0.05% | 0.17% | 6.3 | 9 | −28 |
| 35 | 69.6 | 27.0 | 3.4 | 0.0 | 0.0 | ○ | x | 3787 | 0.33% | 1.29% | 5.5 | 13 | −37 |
| 36 | 70.0 | 26.0 | 4.0 | 0.0 | 0.0 | ○ | ○ | 2913 | 0.10% | 0.37% | 5.5 | 10 | −30 |
| 37 | 69.1 | 23.0 | 7.9 | 0.0 | 0.0 | ○ | ○ | 1517 | 0.03% | 0.13% | 6.1 | 7 | −18 |
| 38 | 68.0 | 25.0 | 7.0 | 0.0 | 0.0 | ○ | ○ | 1760 | 0.02% | 0.10% | 6.1 | 8 | −20 |
| 39 | 67.0 | 27.0 | 6.0 | 0.0 | 0.0 | ○ | ○ | 2291 | 0.06% | 0.33% | 6.0 | 8 | −26 |
| 40* | 64.5 | 27.5 | 8.0 | 0.0 | 0.0 | x | x | 1129 | 0.17% | 1.30% | 6.4 | 8 | −17 |
| 41 | 67.5 | 27.5 | 5.0 | 0.0 | 0.0 | ○ | x | 2855 | 0.25% | 1.29% | 5.8 | 9 | −34 |
| 42 | 69.4 | 27.2 | 3.4 | 0.0 | 0.0 | ○ | x | 3783 | 0.33% | 1.32% | 5.5 | 10 | −38 |
| 45* | 66.5 | 25.5 | 8.0 | 0.0 | 0.0 | x | x | 1173 | 0.10% | 0.59% | 6.3 | 7 | −16 |
| 48* | 80.0 | 17.0 | 3.0 | 0.0 | 0.0 | x | x | 4241 | 0.65% | 0.95% | 4.9 | 8 | −37 |
| 49* | 82.7 | 14.0 | 3.3 | 0.0 | 0.0 | x | x | 4193 | 0.71% | 1.00% | 4.8 | 8 | −35 |

*stands for comparative examples.

In Table 1, the examples and comparative examples which do not include all compositions from the first subcomposition to the fourth subcomposition were recorded. According to Table 1, as for the examples including the compositions within the scope of the present invention, i.e. the examples for which ○ was recorded in the ABCD column, the relative dielectric constant εs, AC breakdown electric field AC-Eb and dielectric loss tan δ at 25° C. were good.

In addition, sample No. 1b with addition of bismuth titanate has good dielectric loss tan δ and temperature characteristic TC, compared with sample No. 1a which has the same composition except that the titanium oxide and bismuth oxide were added independently.

Besides, in the situation when the content of the main composition is within the scope surrounded by the four points, i.e. point A', point B, point C, point D', −33≤TC≤+22 is always satisfied within the scope from −25° C. to +85° C., and excellent characteristics such as good dielectric loss tan δ at 125° C. tend to appear, compared with the situation when the content is beyond the scope limited by the four points, i.e. point A', point B, point C, point D'. Moreover, when −33≤TC≤+22 is always satisfied within the scope from −25° C. to +85° C., the temperature characteristic of Z5T will be satisfied.

On the contrary, as for the comparative examples not including the compositions within the scope of the present invention, one or more characteristic among the relative dielectric constant εs, AC breakdown electric field AC-Eb and dielectric loss tan δ at 25° C. deteriorated.

TABLE 2

| | wt % | | | | | | | | |
|---|---|---|---|---|---|---|---|---|---|
| | The first subcomposition | | The second sub-composition | The third subcomposition | | | The fourth subcomposition | | |
| Sample No. | MnCO$_3$ | Co$_3$O$_4$ | Nb$_2$O$_5$ | SnO$_2$ | ZrO$_2$ | ZnO | Y$_2$O$_3$ | La$_2$O$_3$ | CeO$_2$ |
| 1b | 0.00 | 0.00 | 0.00 | 0.00 | 0.00 | 0.00 | 0.00 | 0.00 | 0.00 |
| 51 | 0.10 | 0.00 | 0.00 | 0.00 | 0.00 | 0.00 | 0.00 | 0.00 | 0.00 |
| 52 | 0.50 | 0.00 | 0.00 | 0.00 | 0.00 | 0.00 | 0.00 | 0.00 | 0.00 |
| 53 | 0.80 | 0.00 | 0.00 | 0.00 | 0.00 | 0.00 | 0.00 | 0.00 | 0.00 |
| 54 | 1.00 | 0.00 | 0.00 | 0.00 | 0.00 | 0.00 | 0.00 | 0.00 | 0.00 |
| 55 | 0.00 | 0.10 | 0.00 | 0.00 | 0.00 | 0.00 | 0.00 | 0.00 | 0.00 |
| 56 | 0.00 | 0.50 | 0.00 | 0.00 | 0.00 | 0.00 | 0.00 | 0.00 | 0.00 |
| 57 | 0.00 | 1.70 | 0.00 | 0.00 | 0.00 | 0.00 | 0.00 | 0.00 | 0.00 |
| 58 | 0.20 | 0.20 | 0.00 | 0.00 | 0.00 | 0.00 | 0.00 | 0.00 | 0.00 |
| 59 | 0.00 | 1.80 | 0.00 | 0.00 | 0.00 | 0.00 | 0.00 | 0.00 | 0.00 |
| 60 | 0.00 | 0.00 | 0.02 | 0.00 | 0.00 | 0.00 | 0.00 | 0.00 | 0.00 |
| 61 | 0.00 | 0.00 | 0.10 | 0.00 | 0.00 | 0.00 | 0.00 | 0.00 | 0.00 |
| 62 | 0.00 | 0.00 | 0.50 | 0.00 | 0.00 | 0.00 | 0.00 | 0.00 | 0.00 |
| 63 | 0.00 | 0.00 | 1.30 | 0.00 | 0.00 | 0.00 | 0.00 | 0.00 | 0.00 |
| 64 | 0.00 | 0.00 | 1.40 | 0.00 | 0.00 | 0.00 | 0.00 | 0.00 | 0.00 |
| 65 | 0.00 | 0.00 | 0.00 | 0.10 | 0.00 | 0.00 | 0.00 | 0.00 | 0.00 |
| 66 | 0.00 | 0.00 | 0.00 | 0.50 | 0.00 | 0.00 | 0.00 | 0.00 | 0.00 |
| 67 | 0.00 | 0.00 | 0.00 | 5.50 | 0.00 | 0.00 | 0.00 | 0.00 | 0.00 |
| 68 | 0.00 | 0.00 | 0.00 | 0.00 | 0.10 | 0.00 | 0.00 | 0.00 | 0.00 |
| 69 | 0.00 | 0.00 | 0.00 | 0.00 | 5.50 | 0.00 | 0.00 | 0.00 | 0.00 |
| 70 | 0.00 | 0.00 | 0.00 | 0.00 | 0.00 | 0.02 | 0.00 | 0.00 | 0.00 |
| 71 | 0.00 | 0.00 | 0.00 | 0.00 | 0.00 | 0.10 | 0.00 | 0.00 | 0.00 |
| 72 | 0.00 | 0.00 | 0.00 | 0.00 | 0.00 | 0.50 | 0.00 | 0.00 | 0.00 |
| 73 | 0.00 | 0.00 | 0.00 | 0.00 | 0.00 | 5.50 | 0.00 | 0.00 | 0.00 |
| 74 | 0.00 | 0.00 | 0.00 | 0.50 | 0.00 | 0.50 | 0.00 | 0.00 | 0.00 |
| 75 | 0.00 | 0.00 | 0.00 | 0.00 | 0.00 | 6.00 | 0.00 | 0.00 | 0.00 |
| 76 | 0.00 | 0.00 | 0.00 | 0.00 | 0.00 | 0.00 | 0.02 | 0.00 | 0.00 |
| 77 | 0.00 | 0.00 | 0.00 | 0.00 | 0.00 | 0.00 | 0.10 | 0.00 | 0.00 |
| 78 | 0.00 | 0.00 | 0.00 | 0.00 | 0.00 | 0.00 | 0.50 | 0.00 | 0.00 |
| 79 | 0.00 | 0.00 | 0.00 | 0.00 | 0.00 | 0.00 | 0.00 | 0.02 | 0.00 |
| 80 | 0.00 | 0.00 | 0.00 | 0.00 | 0.00 | 0.00 | 0.00 | 0.10 | 0.00 |
| 81 | 0.00 | 0.00 | 0.00 | 0.00 | 0.00 | 0.00 | 0.00 | 0.00 | 0.02 |
| 82 | 0.00 | 0.00 | 0.00 | 0.00 | 0.00 | 0.00 | 0.00 | 0.00 | 0.10 |
| 83 | 0.00 | 0.00 | 0.00 | 0.00 | 0.00 | 0.00 | 0.00 | 0.00 | 0.50 |
| 84 | 0.00 | 0.00 | 0.00 | 0.00 | 0.00 | 0.00 | 0.00 | 0.00 | 0.00 |
| 85 | 0.00 | 0.00 | 0.00 | 0.00 | 0.00 | 0.00 | 0.00 | 0.00 | 0.00 |
| 86 | 0.00 | 0.00 | 0.00 | 0.00 | 0.00 | 0.00 | 0.00 | 0.00 | 0.00 |
| 87 | 0.00 | 0.00 | 0.00 | 0.00 | 0.00 | 0.00 | 0.00 | 0.00 | 0.00 |
| 88 | 0.00 | 0.00 | 0.00 | 0.00 | 0.00 | 0.00 | 0.00 | 0.00 | 0.00 |
| 89 | 0.00 | 0.00 | 0.00 | 0.00 | 0.00 | 0.00 | 0.00 | 0.00 | 0.00 |
| 90 | 0.00 | 0.00 | 0.00 | 0.00 | 0.00 | 0.00 | 0.00 | 0.00 | 0.00 |
| 91 | 0.00 | 0.00 | 0.00 | 0.00 | 0.00 | 0.00 | 0.00 | 0.00 | 0.00 |
| 92 | 0.00 | 0.00 | 0.00 | 0.00 | 0.00 | 0.00 | 0.00 | 0.00 | 0.00 |
| 93 | 0.00 | 0.00 | 0.00 | 0.00 | 0.00 | 0.00 | 0.00 | 0.00 | 0.00 |
| 94 | 0.00 | 0.00 | 0.00 | 0.00 | 0.00 | 0.00 | 0.00 | 0.00 | 0.00 |
| 95 | 0.00 | 0.00 | 0.00 | 0.00 | 0.00 | 0.00 | 0.00 | 0.00 | 0.00 |
| 96 | 0.00 | 0.02 | 0.00 | 0.10 | 0.00 | 0.00 | 0.00 | 0.00 | 0.00 |
| 97 | 0.00 | 0.00 | 0.00 | 0.10 | 0.00 | 0.00 | 0.00 | 0.00 | 0.02 |
| 98 | 0.00 | 0.00 | 0.00 | 0.10 | 0.00 | 0.00 | 0.00 | 0.02 | 0.00 |
| 99 | 0.02 | 0.00 | 0.00 | 0.10 | 0.00 | 0.00 | 0.00 | 0.00 | 0.00 |
| 100 | 0.00 | 0.00 | 0.00 | 0.10 | 0.00 | 0.00 | 0.00 | 0.00 | 0.00 |
| 101 | 0.00 | 0.00 | 0.00 | 0.10 | 0.00 | 0.00 | 0.02 | 0.00 | 0.00 |
| 102 | 0.00 | 0.00 | 0.00 | 0.10 | 0.00 | 0.00 | 0.00 | 0.10 | 0.00 |
| 103 | 0.00 | 0.00 | 0.00 | 0.10 | 0.00 | 0.00 | 0.00 | 0.00 | 0.00 |
| 104 | 0.00 | 0.00 | 0.00 | 0.10 | 0.00 | 0.00 | 0.00 | 0.00 | 0.00 |

| | wt % | | | Various Characteristics | | | | | |
|---|---|---|---|---|---|---|---|---|---|
| | The fourth subcomposition | | | 25° C. | 125° C. | | AC-Eb | TC (%) | |
| Sample No. | Nd$_2$O$_3$ | Sm$_2$O$_3$ | Dy$_2$O$_3$ | εs | tan δ | tan δ | (V) | −25° C. | 85° C. |
| 1b | 0.00 | 0.00 | 0.00 | 2812 | 0.12% | 0.40% | 5.9 | 10 | −33 |
| 51 | 0.00 | 0.00 | 0.00 | 2603 | 0.10% | 0.12% | 6.2 | 9 | −31 |
| 52 | 0.00 | 0.00 | 0.00 | 2315 | 0.25% | 0.10% | 5.3 | 5 | −23 |
| 53 | 0.00 | 0.00 | 0.00 | 2036 | 0.40% | 0.08% | 5.5 | 2 | −18 |
| 54 | 0.00 | 0.00 | 0.00 | 1863 | 0.55% | 0.08% | 5.4 | 2 | −16 |
| 55 | 0.00 | 0.00 | 0.00 | 2673 | 0.13% | 0.24% | 5.7 | 10 | −31 |
| 56 | 0.00 | 0.00 | 0.00 | 2420 | 0.16% | 0.22% | 5.5 | 8 | −27 |
| 57 | 0.00 | 0.00 | 0.00 | 1503 | 0.32% | 0.20% | 5.1 | 2 | −13 |
| 58 | 0.00 | 0.00 | 0.00 | 2256 | 0.27% | 0.07% | 5.6 | 5 | −24 |
| 59 | 0.00 | 0.00 | 0.00 | 1263 | 0.40% | 0.14% | 5.0 | 2 | −7 |
| 60 | 0.00 | 0.00 | 0.00 | 2794 | 0.25% | 0.10% | 6.0 | 11 | −32 |

TABLE 2-continued

| | | | | | | | | |
|---|---|---|---|---|---|---|---|---|
| 61 | 0.00 | 0.00 | 0.00 | 2703 | 0.20% | 0.08% | 5.7 | 11 | −31 |
| 62 | 0.00 | 0.00 | 0.00 | 2311 | 0.20% | 0.05% | 6.1 | 10 | −30 |
| 63 | 0.00 | 0.00 | 0.00 | 1509 | 0.18% | 0.05% | 6.2 | 10 | −8 |
| 64 | 0.00 | 0.00 | 0.00 | 1278 | 0.19% | 0.05% | 6.0 | 10 | −7 |
| 65 | 0.00 | 0.00 | 0.00 | 2759 | 0.09% | 0.21% | 6.2 | 10 | −32 |
| 66 | 0.00 | 0.00 | 0.00 | 2583 | 0.08% | 0.27% | 6.6 | 10 | −30 |
| 67 | 0.00 | 0.00 | 0.00 | 1515 | 0.06% | 0.20% | 6.4 | 10 | −8 |
| 68 | 0.00 | 0.00 | 0.00 | 2809 | 0.10% | 0.33% | 5.8 | 11 | −32 |
| 69 | 0.00 | 0.00 | 0.00 | 1523 | 0.07% | 0.23% | 5.9 | 2 | −9 |
| 70 | 0.00 | 0.00 | 0.00 | 2721 | 0.16% | 0.53% | 5.9 | 10 | −32 |
| 71 | 0.00 | 0.00 | 0.00 | 2729 | 0.20% | 0.67% | 5.7 | 10 | −31 |
| 72 | 0.00 | 0.00 | 0.00 | 2560 | 0.22% | 0.73% | 5.9 | 8 | −29 |
| 73 | 0.00 | 0.00 | 0.00 | 1530 | 0.25% | 0.80% | 5.8 | 2 | −10 |
| 74 | 0.00 | 0.00 | 0.00 | 2408 | 0.21% | 0.70% | 5.8 | 3 | −9 |
| 75 | 0.00 | 0.00 | 0.00 | 1269 | 0.26% | 0.80% | 5.7 | 7 | −26 |
| 76 | 0.00 | 0.00 | 0.00 | 2818 | 0.16% | 0.53% | 5.3 | 10 | −32 |
| 77 | 0.00 | 0.00 | 0.00 | 2443 | 0.39% | 0.78% | 5.9 | 9 | −31 |
| 78 | 0.00 | 0.00 | 0.00 | 2423 | 0.40% | 0.80% | 5.7 | 9 | −30 |
| 79 | 0.00 | 0.00 | 0.00 | 2869 | 0.11% | 0.37% | 5.6 | 9 | −32 |
| 80 | 0.00 | 0.00 | 0.00 | 2733 | 0.09% | 0.30% | 5.5 | 10 | −31 |
| 81 | 0.00 | 0.00 | 0.00 | 2764 | 0.12% | 0.40% | 5.9 | 10 | −32 |
| 82 | 0.00 | 0.00 | 0.00 | 2701 | 0.11% | 0.37% | 6.0 | 10 | −31 |
| 83 | 0.00 | 0.00 | 0.00 | 2661 | 0.10% | 0.33% | 5.5 | 10 | −30 |
| 84 | 0.02 | 0.00 | 0.00 | 2801 | 0.13% | 0.43% | 5.9 | 10 | −32 |
| 85 | 0.10 | 0.00 | 0.00 | 2725 | 0.11% | 0.37% | 5.7 | 10 | −31 |
| 86 | 0.50 | 0.00 | 0.00 | 2174 | 0.18% | 0.60% | 6.0 | 9 | −29 |
| 87 | 1.00 | 0.00 | 0.00 | 1510 | 0.25% | 0.79% | 5.8 | 9 | −8 |
| 88 | 0.00 | 0.02 | 0.00 | 2819 | 0.13% | 0.43% | 5.0 | 10 | −32 |
| 89 | 0.00 | 0.10 | 0.00 | 2766 | 0.15% | 0.50% | 5.2 | 10 | −31 |
| 90 | 0.00 | 0.50 | 0.00 | 2258 | 0.40% | 0.78% | 5.4 | 9 | −30 |
| 91 | 0.00 | 1.00 | 0.00 | 1601 | 0.50% | 0.79% | 5.3 | 8 | −10 |
| 92 | 0.00 | 0.00 | 0.10 | 2471 | 0.18% | 0.60% | 5.9 | 9 | −31 |
| 93 | 0.00 | 0.00 | 0.50 | 2319 | 0.28% | 0.80% | 6.1 | 9 | −30 |
| 94 | 0.00 | 0.20 | 0.20 | 2305 | 0.34% | 0.71% | 5.8 | 9 | −22 |
| 95 | 0.00 | 1.20 | 0.00 | 1299 | 0.55% | 0.76% | 5.1 | 1 | −7 |
| 96 | 0.00 | 0.00 | 0.00 | 2442 | 0.12% | 0.23% | 6.1 | 8 | −28 |
| 97 | 0.00 | 0.00 | 0.00 | 2522 | 0.14% | 0.47% | 6.0 | 8 | −29 |
| 98 | 0.00 | 0.00 | 0.00 | 2482 | 0.13% | 0.43% | 6.4 | 9 | −30 |
| 99 | 0.00 | 0.00 | 0.00 | 2733 | 0.15% | 0.12% | 6.1 | 9 | −32 |
| 100 | 0.02 | 0.00 | 0.00 | 2689 | 0.15% | 0.50% | 6.0 | 9 | −31 |
| 101 | 0.00 | 0.00 | 0.00 | 2639 | 0.20% | 0.67% | 6.2 | 9 | −30 |
| 102 | 0.00 | 0.00 | 0.00 | 2580 | 0.10% | 0.33% | 6.1 | 10 | −32 |
| 103 | 0.00 | 0.00 | 0.02 | 2662 | 0.10% | 0.33% | 6.2 | 10 | −31 |
| 104 | 0.00 | 0.02 | 0.00 | 2617 | 0.10% | 0.33% | 6.3 | 9 | −31 |

In Table 2, the embodiments which include the same content of the main composition as sample No. 1b and changed content of the subcomposition were recorded.

According to samples No. 1b and 51-54 in Table 2, samples No. 51-53 including 0.8 wt % or less of manganese oxide converted to MnCO$_3$ had excellent temperature characteristic and dielectric loss at 125° C., compared with sample No. 1b not including manganese oxide. Especially for samples No. 52, 53 including 0.5-0.8 wt % of manganese oxide, the temperature characteristic was more excellent compared with sample No. 51 including 0.1 wt % of manganese oxide. In addition, samples No. 51-53 had excellent relative dielectric constant and dielectric loss at 25° C. compared with sample No. 54 including 1.0 wt % of manganese oxide.

According to samples No. 1b and 55-57 and 59 in Table 2, samples No. 55-57 including 1.7 wt % or less of cobalt oxide converted to Co$_3$O$_4$ had excellent temperature characteristic and dielectric loss at 125° C., compared with sample No. 1b not including cobalt oxide. Especially for samples No. 56 and 57 including 0.5-1.7 wt % of cobalt oxide, the temperature characteristic was more excellent compared with sample No. 55 including 0.1 wt % of manganese oxide. In addition, samples No. 55-57 had excellent relative dielectric constant and dielectric loss at 25° C. compared with sample No. 59 including 1.8 wt % of cobalt oxide.

According to samples No. 1b and 58 in Table 2, sample No. 58 including both manganese oxide and cobalt oxide had excellent temperature characteristic compared with sample No. 1b including neither manganese oxide nor cobalt oxide.

According to samples No. 1b and 60-64 in Table 2, samples No. 60-63 including 1.3 wt % or less of niobium oxide had excellent temperature characteristic at high temperature and dielectric loss at 125° C., compared with sample No. 1b not including niobium oxide. Especially for samples No. 62 and 63 including 0.5-1.3 wt % of niobium oxide, the temperature characteristic was excellent compared with samples No. 60 and 61 including less than 0.5 mass % of niobium oxide. In addition, samples No. 60-63 had excellent relative dielectric constant compared with sample No. 64 including 1.4 wt % of niobium oxide.

According to samples No. 1b and 65-75 in Table 2, samples No. 65-74 including 5.5 wt % or less of the third subcomposition had excellent temperature characteristic at high temperature compared with sample No. 1b not including the third subcomposition. Especially for samples No. 66, 67, 69 and 72-74 including 0.5-5.5 wt % of the third subcomposition, the temperature characteristic was excellent compared with samples No. 65, 68, 70 and 71 including less than 0.5 mass % of the third subcomposition. In addition, samples No. 65-74 had excellent relative dielectric constant and dielectric loss at 25° C. compared with sample No. 75 including 6.0 wt % of the third subcomposition.

According to samples No. 1b and 76-95 in Table 2, samples No. 76-94 including less than 1.0 wt % of the fourth subcomposition had excellent temperature characteristic compared with sample No. 1b not including the fourth subcomposition. Especially for the samples including 0.1-1.0 wt % of the fourth subcomposition, the temperature characteristic was excellent compared with the samples including less than 0.1 wt % of the fourth subcomposition. In addition, samples No. 76-94 had superior relative dielectric constant and dielectric loss at 25° C. compared with sample No. 95 including 1.2 wt % of the fourth subcomposition.

Samples No. 96-104 including 0.1 wt % of tin oxide as the third subcomposition and further including the first subcomposition or the fourth subcomposition had excellent AC breakdown electric field and temperature characteristic, compared with sample No. 1b not including the first subcomposition to the fourth subcomposition.

In Table 3, the embodiments (samples No. 105-120) which include the same content of the main composition as sample No. 1b and include all compositions from the first subcomposition to the fourth subcomposition were recorded. In addition, for all the samples recorded in Table 3, the first subcomposition was compounds containing manganese, the second subcomposition was compounds containing niobium, and the third subcomposition was compounds containing tin. The fourth subcomposition was compounds containing samarium in samples No. 105-112, and compounds containing dysprosium in samples No. 113-120.

Samples No. 105-120 including all compositions from the first subcomposition to the fourth subcomposition had excellent AC breakdown electric field, temperature characteristic, and dielectric loss at 125° C., compared with sample No. 1b not including the subcomposition. The dielectric loss at 125° C. was especially more excellent than other embodiments recorded in Table 1 and Table 2.

TABLE 3

| Sample No. | The first sub-composition MnCO$_3$ | The second sub-composition Nb$_2$O$_5$ | The third sub-composition SnO$_2$ | The fourth subcomposition Sm$_2$O$_3$ | The fourth subcomposition Dy$_2$O$_3$ | The third subcomposition/Total subcomposition |
|---|---|---|---|---|---|---|
| 1b | 0.00 | 0.00 | 0.00 | 0.00 | 0.00 | |
| 105 | 0.10 | 0.20 | 0.09 | 0.02 | 0.00 | 0.22 |
| 106 | 0.10 | 0.20 | 0.10 | 0.02 | 0.00 | 0.24 |
| 107 | 0.02 | 0.02 | 1.00 | 0.14 | 0.00 | 0.85 |
| 108 | 0.02 | 0.02 | 1.10 | 0.14 | 0.00 | 0.86 |
| 109 | 0.22 | 0.42 | 0.30 | 0.10 | 0.00 | 0.29 |
| 110 | 0.20 | 0.40 | 0.30 | 0.10 | 0.00 | 0.30 |
| 111 | 0.04 | 0.04 | 0.55 | 0.20 | 0.00 | 0.66 |
| 112 | 0.04 | 0.04 | 0.60 | 0.20 | 0.00 | 0.68 |
| 113 | 0.10 | 0.20 | 0.09 | 0.00 | 0.02 | 0.22 |
| 114 | 0.10 | 0.20 | 0.10 | 0.00 | 0.02 | 0.24 |
| 115 | 0.02 | 0.02 | 1.00 | 0.00 | 0.14 | 0.85 |
| 116 | 0.02 | 0.02 | 1.10 | 0.00 | 0.14 | 0.86 |
| 117 | 0.22 | 0.42 | 0.30 | 0.00 | 0.10 | 0.29 |
| 118 | 0.20 | 0.40 | 0.30 | 0.00 | 0.10 | 0.30 |
| 119 | 0.04 | 0.04 | 0.55 | 0.00 | 0.20 | 0.66 |
| 120 | 0.04 | 0.04 | 0.60 | 0.00 | 0.20 | 0.68 |

| Sample No. | (The third subcomposition + the fourth subcomposition)/total subcomposition | 25° C. εs | 125° C. tan δ | 125° C. tan δ | AC-Eb (V) | TC (%) −25° C. | TC (%) 85° C. |
|---|---|---|---|---|---|---|---|
| 1b | | 2812 | 0.12% | 0.40% | 5.9 | 10 | −33 |
| 105 | 0.27 | 2456 | 0.16% | 0.01% | 6.6 | 9 | −29 |
| 106 | 0.29 | 2575 | 0.15% | 0.01% | 6.3 | 8 | −28 |
| 107 | 0.97 | 2673 | 0.15% | 0.01% | 6.7 | 8 | −28 |
| 108 | 0.97 | 2541 | 0.17% | 0.01% | 6.3 | 9 | −30 |
| 109 | 0.38 | 2545 | 0.11% | 0.01% | 6.6 | 7 | −28 |
| 110 | 0.40 | 2598 | 0.10% | 0.01% | 6.8 | 7 | −26 |
| 111 | 0.90 | 2601 | 0.10% | 0.01% | 6.7 | 7 | −27 |
| 112 | 0.91 | 2578 | 0.11% | 0.01% | 6.0 | 7 | −28 |
| 113 | 0.27 | 2443 | 0.17% | 0.01% | 6.5 | 9 | −30 |
| 114 | 0.29 | 2638 | 0.15% | 0.01% | 6.7 | 8 | −28 |
| 115 | 0.97 | 2701 | 0.14% | 0.01% | 6.3 | 8 | −28 |
| 116 | 0.97 | 2591 | 0.16% | 0.01% | 6.2 | 9 | −30 |
| 117 | 0.38 | 2610 | 0.11% | 0.01% | 6.4 | 7 | −28 |
| 118 | 0.40 | 2651 | 0.09% | 0.01% | 6.4 | 6 | −25 |
| 119 | 0.90 | 2666 | 0.10% | 0.01% | 6.6 | 7 | −26 |
| 120 | 0.91 | 2634 | 0.11% | 0.01% | 6.0 | 7 | −28 |

In the situations when the content of the third subcomposition was 24-85% of the total content of compositions from the first subcomposition to the fourth subcomposition (samples No. 106, 107, 109-112, 114, 115 and 117-120), the temperature characteristic and dielectric loss at 25° C. were more excellent than the situations when the content was not 24-85% (samples No. 105, 108, 113 and 116).

In the situations when the content of the third subcomposition was 24-85% of the total content of compositions from the first subcomposition to the fourth subcomposition, and the total content of the third subcomposition and the fourth subcomposition was 40-90% of the total content of compositions from the first subcomposition to the fourth subcomposition (samples No. 110, 111, 118 and 119), the temperature characteristic and dielectric loss at 25° C. were more excellent than other situations.

DESCRIPTION OF THE SYMBOLS

1 Single layer capacitor
10 Dielectric composition
12a, 12b Terminals
14a, 14b Electrodes
16 Synthetic resin

The invention claimed is:

1. A dielectric composition comprising barium titanate, strontium titanate, titanium oxide and bismuth oxide, wherein
a content of barium titanate, converted to $BaTiO_3$, is a mol %,
a content of strontium titanate, converted to $SrTiO_3$, is b mol %,
a content of titanium oxide and bismuth oxide, converted to $Bi_2Ti_3O_9$, is c mol %, a+b+c=100, and a, b and c are values within a scope surrounded by the following four points, point A', point B, point C and point D' in a three-dimensional phase diagram,
point A': (a, b, c)=(64.1, 28.0, 7.9)
point B: (a, b, c)=(86.5, 5.6, 7.9)
point C: (a, b, c)=(91.0, 5.6, 3.4)
point D': (a, b, c)=(70.8, 25.8, 3.4).

2. A dielectric composition comprising barium titanate, strontium titanate, titanium oxide and bismuth oxide, wherein
a content of barium titanate, converted to $BaTiO_3$, is a mol %,
a content of strontium titanate, converted to $SrTiO_3$, is b mol %,
a content of titanium oxide and bismuth oxide, converted to $Bi_2Ti_3O_9$, is c mol %, a+b+c=100, and a, b and c are values within a scope surrounded by the following four points, point A, point B, point C and point D, in a three-dimensional phase diagram, and wherein
the total content of the titanium oxide and the bismuth oxide, converted to $Bi_2Ti_3O_9$, is 100 parts by weight, and
the titanium oxide and the bismuth oxide existing in the form of bismuth titanate are 80 parts by weight or more,
point A: (a, b, c)=(52.1, 40.0, 7.9)
point B: (a, b, c)=(86.5, 5.6, 7.9)
point C: (a, b, c)=(91.0, 5.6, 3.4)
point D: (a, b, c)=(56.6, 40.0, 3.4).

3. The dielectric composition according to claim 1, wherein
at least one of a first subcomposition to a fourth subcomposition is contained,
the first subcomposition comprises at least one of a compound containing manganese and a compound containing cobalt,
the second subcomposition comprises a compound containing niobium,
the third subcomposition comprises at least one of a compound containing zirconium, a compound containing tin and a compound containing zinc, and
the fourth subcomposition comprises at least one of a compound containing yttrium, a compound containing lanthanum, a compound containing cerium, a compound containing neodymium, a compound containing samarium and a compound containing dysprosium.

4. The dielectric composition according to claim 3, wherein
a total content of barium titanate, strontium titanate, titanium oxide and bismuth oxide is 100 parts by weight,
the content of the first subcomposition which is a compound containing manganese, converted to $MnCO_3$, is 0.8 parts by weight or less including zero, and a compound containing cobalt, converted to $Co_3O_4$, is 1.7 parts by weight or less including zero,
the content of the second subcomposition which is a compound containing niobium, converted to $Nb_2O_5$, is 1.3 parts by weight or less including zero,
the total content of the third subcomposition is 5.5 parts by weight or less including zero, when the content of each composition included in the third subcomposition is converted to $ZrO_2$, $SnO_2$, $ZnO$ respectively, and
the total content of the fourth subcomposition is 1.0 parts by weight or less including zero, when the content of each composition included in the fourth subcomposition is converted to $Y_2O_3$, $La_2O_3$, $CeO_2$, $Nd_2O_3$, $Sm_2O_3$, $Dy_2O_3$ respectively.

5. The dielectric composition according to claim 3, comprising all the compositions from the first subcomposition to the fourth subcomposition.

6. The dielectric composition according to claim 4, comprising all the compositions from the first subcomposition to the fourth subcomposition.

7. The dielectric composition according to claim 6, wherein
a weight ratio of a total content of the third subcomposition and the fourth subcomposition to a total content from the first subcomposition to the fourth subcomposition is 0.4 to 0.9.

8. An electric component comprising the dielectric composition according to claim 1.

9. The dielectric composition according to claim 1, wherein
the total content of the titanium oxide and the bismuth oxide, converted to $Bi_2Ti_3O_9$, is 100 parts by weight, and
the titanium oxide and the bismuth oxide existing in the form of bismuth titanate are 80 parts by weight or more.

10. The dielectric composition according to claim 2, wherein
at least one of a first subcomposition to a fourth subcomposition is contained,
the first subcomposition comprises at least one of a compound containing manganese and a compound containing cobalt, the second subcomposition comprises a compound containing niobium, the third subcomposition comprises at least one of a compound containing zirconium, a compound containing tin and a compound containing zinc, and the fourth subcomposition comprises at least one of a compound containing yttrium, a compound containing lanthanum, a compound containing cerium, a compound containing neodymium, a compound containing samarium and a compound containing dysprosium.

11. The dielectric composition according to claim 10, wherein a total content of barium titanate, strontium titanate, titanium oxide and bismuth oxide is 100 parts by weight, the content of the first subcomposition which is a compound containing manganese, converted to $MnCO_3$, is 0.8 parts by weight or less including zero, and a compound containing cobalt, converted to $Co_3O_4$, is 1.7 parts by weight or less including zero, the content of the second subcomposition which is a compound containing niobium, converted to $Nb_2O_5$, is 1.3 parts by weight or less including zero, the total content of the third subcomposition is 5.5 parts by weight or less including zero, when the content of each composition included in the third subcomposition is converted to $ZrO_2$, $SnO_2$, ZnO respectively, and the total content of the fourth subcomposition is 1.0 parts by weight or less including zero, when the content of each composition included in the fourth subcomposition is converted to $Y_2O_3$, $La_2O_3$, $CeO_2$, $Nd_2O_3$, $Sm_2O_3$, $Dy_2O_3$ respectively.

12. The dielectric composition according to claim 10, comprising all the compositions from the first subcomposition to the fourth subcomposition.

13. The dielectric composition according to claim 11, comprising all the compositions from the first subcomposition to the fourth subcomposition.

14. The dielectric composition according to claim 13, wherein a weight ratio of a total content of the third subcomposition and the fourth subcomposition to a total content from the first subcomposition to the fourth subcomposition is 0.4-0.9.

15. An electric component comprising the dielectric composition according to claim 2.

* * * * *